United States Patent [19]
Brodeur, Jr.

[11] Patent Number: 5,352,158
[45] Date of Patent: Oct. 4, 1994

[54] COURT SURFACE

[76] Inventor: Edouard A. Brodeur, Jr., 141 Huntcliff Ct., Marietta, Ga. 30066

[21] Appl. No.: 970,254

[22] Filed: Nov. 2, 1992

[51] Int. Cl.$^5$ ............................................. E04F 15/16
[52] U.S. Cl. ...................................... 472/92; 404/19; 404/32
[58] Field of Search .................... 472/92-94; 404/19, 32; 428/17, 87, 95

[56] References Cited

U.S. PATENT DOCUMENTS

| | | | |
|---|---|---|---|
| 2,515,847 | 7/1950 | Winkler . | |
| 3,332,828 | 7/1967 | Faria . | |
| 3,346,122 | 5/1969 | Raichle | 472/92 |
| 3,661,687 | 5/1972 | Spinney | 161/21 |
| 3,740,303 | 6/1973 | Alderson . | |
| 3,801,421 | 4/1974 | Allen | 161/67 |
| 3,900,656 | 8/1975 | Schmidt | 428/215 |
| 4,044,179 | 8/1977 | Haas | 428/17 |
| 4,501,420 | 2/1985 | Dury | 472/92 |
| 4,523,755 | 6/1985 | Turba | 472/92 |
| 5,085,424 | 2/1992 | Wood | 472/92 |
| 5,183,438 | 2/1993 | Blom | 472/92 |

FOREIGN PATENT DOCUMENTS 2536098  5/1984  France ................... 472/92

OTHER PUBLICATIONS

WO88/06971, Int. Appl., Sep. 22, 1988.

*Primary Examiner*—Carl D. Friedman
*Assistant Examiner*—Beth A. Aubrey
*Attorney, Agent, or Firm*—Willian Brinks Hofer Gilson & Lione

[57] ABSTRACT

A tennis court surface comprising a foam material, a scrim material and a top surface containing a thermosetting resin that resists absorption of plasticizers. The composition can be varied to simulate various types of tennis court surfaces such as grass, clay and hard surfaces. The tennis court surface optionally may contain additional components including a thermoplastic back and a thermoplastic face coating on the scrim material, and a barrier layer component between the scrim material and the top surface.

17 Claims, 3 Drawing Sheets

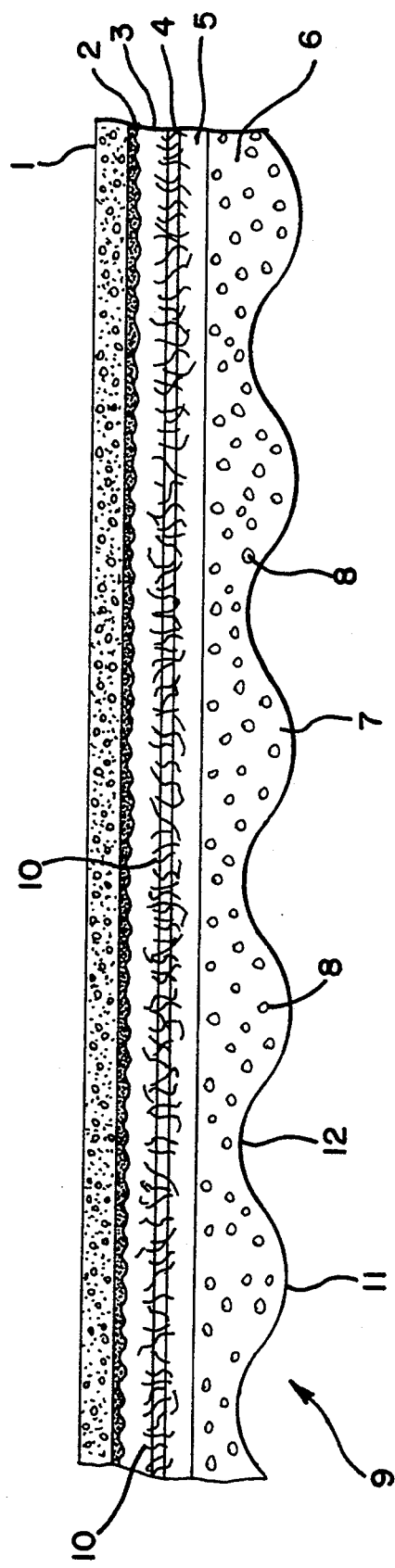

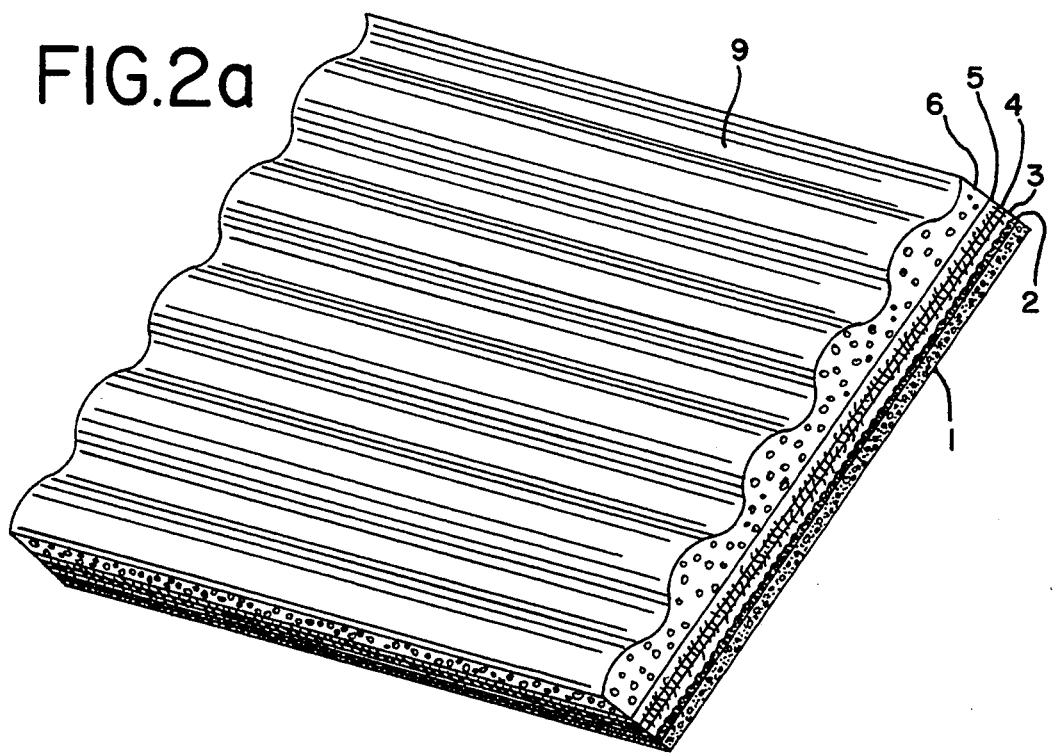
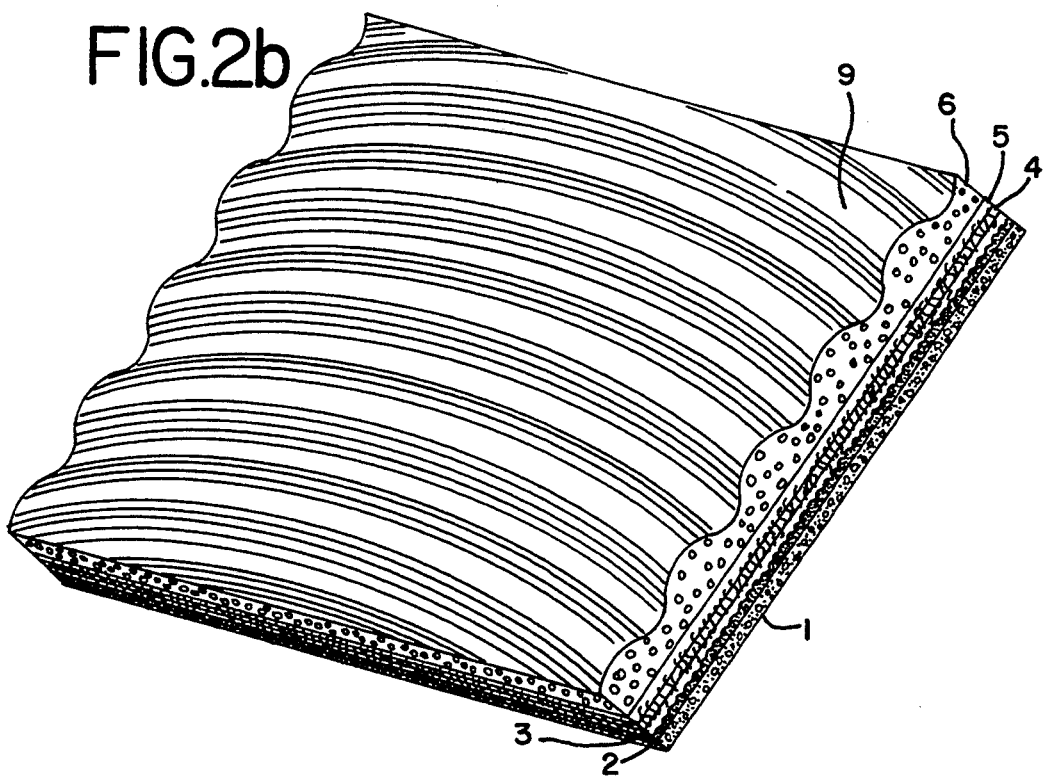

COURT SURFACE

BACKGROUND OF THE INVENTION

1. Field Of Invention

The invention relates to indoor and outdoor court surfaces for games and activities, especially where a ball is used. More particularly, the invention relates to tennis court surfaces.

2. Background Information

Current tennis court surfaces generally fall under three categories: grass or lawn type surfaces; compacted clay type surfaces; and hard surfaces. These surfaces are different in appearance and playing characteristics and each have advantages and disadvantages. For example, grass courts are characterized by a very fast surface which enhances the speed of a tennis game. However, these court surfaces are expensive to install and maintain and are subject to erratic ball behavior. In addition, the use of grass surfaces is very seasonal.

Clay courts are characterized by a soft, spin receptive surface which induces slow play and helps reduce player injuries. However, clay courts require high maintenance and are also limited to seasonal use because of weather conditions.

Hard courts generally contain asphaltic or concrete pad surfaces painted over with a resinous material usually in the form of an acrylic latex water based emulsion. These surfaces are subject to structural and thermal cracking, and may also cause joint, ligament and tendon damage to players. Hard court surfaces also cause excessive wear to shoes and tennis balls, and cause a tennis ball bounce pattern that is too high and not spin receptive enough to reward a good tennis shot.

Attempts have been made to produce a court surface that would combine the positive attributes of these surfaces while eliminating the disadvantages. Some limited success has been achieved indoors; however all attempts to produce an outdoor surface with the aforementioned desirable characteristics have met with failure.

For example, attempts have been made to laminate closed cell urethane as well as polyethylene foams to a variety of surfaces and in some cases to coat these with acrylic coatings. However, normal seasonal, daily and hourly temperature changes cause undue tension on seams and multiple wrinkles from contraction and expansion of the cells. In addition, most urethanes suitable to such approaches are not suitable for long term outdoor exposure.

Vinyl products with closed cells as well as some open cells have been tried. However, in addition to the same problems with closed cells, unsightly and problematic seams could not be hidden. In addition, surface tack and premature early soiling has been observed. Gradual shrinking as well as surface hardening from gradual plasticizer loss from evaporation as well as water extraction also created problems. Attempts to coat vinyl surfaces with standard color coating systems used in the trade failed for reason of polar affinity of the coatings used with the plasticizers in the vinyl systems. The resulting lowering of the glass transition point of the acrylic, ethylene vinyl acetates, as well as styrene containing copolymers used in the trade created conditions ranging from instant tack to slow gradual softening of the polymer system used.

Furthermore, the prior art consists of assembling components with little or no background or regard for the interaction of the ball to the surface to create a specific type of play.

SUMMARY OF THE INVENTION

The invention is a court surface comprising a foam material, a scrim material and a thermosetting resin material located above the scrim comprising, for example, a urethane polymer. The construction, formulation and arrangement of these and optional materials may be varied to alter the interaction between the ball and the court and the player and the court. Accordingly, the court surface of the invention can be adjusted to approximate one or more of the grass, clay and hard court surface characteristics.

BRIEF DESCRIPTION OF THE DRAWINGS

FIG. 1 illustrates one embodiment of the invention in a cross section perspective.

FIG. 2(a) shows one embodiment of a bottom of the court surface of the invention.

FIG. 2(b) shows another embodiment of the court surface of the invention.

DETAILED DESCRIPTION OF THE DRAWINGS AND PREFERRED EMBODIMENTS

Figure 3:
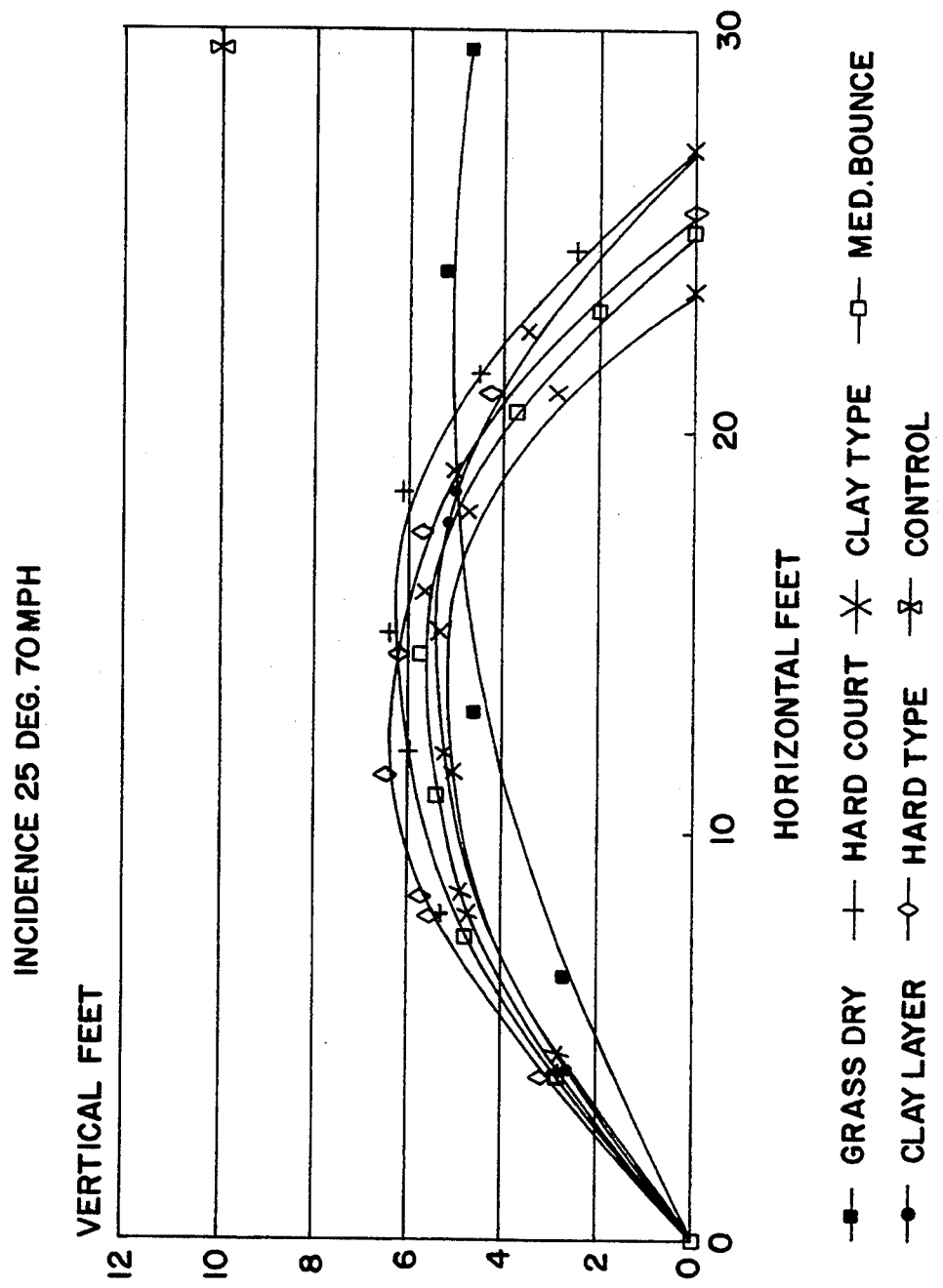
FIG. 3 is a graphical illustration of bounce characteristics of several court surfaces.

In accordance with the invention, the coefficient of friction, compression, surface elasticity and free air properties of a court surface may be altered to obtain a court with predetermined characteristics. Thus, the coefficient of restitution, the biophysical response, and the ball/surface response of a court surface, including the speed and angle of a ball coming off of the surface, can be tailored to desired needs and preferences.

The coefficient of friction of the court surface affects the speed, the type and the safety of play on the court. It generally varies as a result of ball cover fluffing, rapid shoe wear, and safety of play. The combination of excessive friction on the court surface and high body inertia will cause trauma, early fatigue to lower body muscles and tendons and frequent ankle injuries to a firmly implanted foot. Too little friction results in a variety of injuries from lost footing.

The invention embodies the capability to alter the coefficient of friction of a court surface by altering the surface area of the court that will contact an object, such as a ball or shoe. This is accomplished by varying the ability of the surface to compress, stretch and rise from the base upon which it lays. For example, the ratio of inert components, such as sand, to polymer components at the top of the court surface, and the softness and durometer of the entire court surface can be varied to control either the pure coefficient of friction between the surface and the shoe and/or the ability of the surface to mold and form itself to the traction patterns of the bottom of the tennis shoe.

Surface elasticity affects surface impact forces, such as created by a shoe or ball contacting the surface. As discussed in greater detail, the invention can effectively provide a surface that will give along the horizontal axis, by varying the durometer of the various plies coatings or layers, by adding or removing a back coat, and by varying the elasticity of the scrim. The floating ability of the surface also affects this dimension.

FIG. 1 illustrates a court surface of the invention containing a foam backing 6, a back coat 5, a scrim 4, a face coat 3, a barrier coat 2, and a top coat 1. The foam backing 6 of the court surface shown in FIG. 1 is constructed from any thermoplastic material that will form a foam according to commonly known techniques. Preferably, the foam backing is made from a formulation comprising polyvinyl chloride. The foam backing is manufactured to contain a combination of open 8 and closed 7 cells in the interior, and grooves 9 at the bottom, formed by extended portions 11 and recessed portions 12.

The cells in the foam layer can be varied in thickness, hardness, and in the number to vary the amount of free air. The ratio of closed to open cells is controlled by varying the pounds per cubic foot of the foam, the balance of silicone surfactant with nitrogen producing chemical blowing agents and the amount of water.

The bottom grooves 9 may be arranged in either a unidirectional pattern (FIG. 2(a)) or a wave pattern (FIG. 2(b)). The open grooves in the backing are formed by passing the foam formulation with a measured amount of air through a chamber consisting of a plurality fixed and moving vanes or pins for sufficient time to form a froth consistency that is pumped and applied to the back of the material by means of a fixed or oscillating blade.

The foam backing formulation will generally comprise a thermoplastic plastisol grade resin, a thermoplastic suspension grade resin, a filler, a plasticizer and a surfactant. A preferred thermoplastic plastisol resin is a polymer or copolymer polyvinyl chloride dispersion type resin, such as Oxydental 6338 or 0565, B. F. Goodrich 135 or 137, Formosa SCC 40. The thermoplastic suspension grade resin includes compounds such as Oxydental 521, Goodyear M series and MC85, Borden 260. The filler is preferably calcium carbonate, but may also include other fillers, such as silicas, aluminum trihydrates, clays, barium sulfates, and micro spheres. The preferred plasticizer is dioctyl phthalate, but may also include other plasticizers such as other phthalates such as dihexyl, diisodecyl, diisononyl, butyl benzyl, dibutyl, phosphates, benzoated. The surfactant is preferably a silicone compound, such as Dow Corning silicone surfactant #1250 but may also be General Electric #4255 or Vanderbilt Foamade.

A chemical blowing agent may also be employed in the foam. Preferably, the chemical blowing agent is water, but it may also comprise nitrogen producing agents such as azodicarbonamide or bezenesulfonyl hydrazide.

Depending on the court surface characteristics desired, the thermoplastic vinyl dispersion resin is present in the backing formulation in amounts between 50 to 80 parts. The larger particle suspension grade resin will vary correspondingly between 20 and 50 parts. The filler is present between 0 and 100 parts. The plasticizer is present between 70 and 90 parts. The surfactant is present between 0 to 4 parts. The chemical blowing agent is present between 0 and 6 parts; water is present between 0 and 5 parts.

The foam backing may be manufactured by common foam making techniques, such as Oaks foamer or a Less foamer. Again depending on the court surface characteristics desired, the backing may be made to contain a foam density of about 20 to 70 pounds per cubic foot, a Durometer Shore 00 of about 50 to 80 (units), between about 0 to 10 cubic inches per square foot of grooves or channel voids, and about 0 to 10 cubic inches of open cell voids per square foot. The durometer (hardness) of the foam is controlled by balancing the percentage of air and the level of plasticizer in the formulation. The foam backing should have a coating weight of about 20 to 40 ounces per square yard.

The following are examples according to the invention of foam backings for a clay type slow court, a medium speed and bounce height court, and a high bounce hard court type surface.

| CLAY TYPE | |
|---|---|
| Foam Formulation: | |
| Copolymer PVC dispersion type resin | 60 parts |
| Suspension grade plastisol resin | 40 parts |
| Low oil absorption calcium carbonate | 50–100 parts |
| Dioctyl phthalate plasticizer | 70–90 parts |
| Silicone surfactant | 3–4 parts |
| Foam Density | 30–40 lb./cu. ft. |
| Durometer Shore 00 | 50–60 |
| Channel void per square foot | 9–10 cu. in. |
| Open cell voids per square foot | 9–10 cu. in. |
| Coating weight | 25–30 oz./sq. yd. |
| MEDIUM TYPE | |
| Foam Formulation: | |
| Copolymer PVC dispersion type resin | 60 parts |
| Suspension grade plastisol resin | 40 parts |
| Low oil absorption calcium carbonate | 50–100 parts |
| Dioctyl phthalate plasticizer | 70–80 parts |
| Silicone surfactant | 2–3 parts |
| Foam Density | 40–50 lb./cu. ft. |
| Durometer Shore 00 | 60–70 |
| Channel void per square foot | 1–3 cu. in. |
| Open cell voids per square foot | 5–7 cu. in. |
| Coating weight | 40–50 oz./sq. yd. |
| HARD COURT TYPE | |
| Foam Formulation: | |
| Copolymer PVC dispersion type resin | 80–100 parts |
| Suspension grade resin | 0–20 parts |
| Low oil absorption calcium carbonate | 0–20 parts |
| Dioctyl phthalate plasticizer | 70–80 parts |
| Silicone surfactant | 1–2 parts |
| Chemical blow | 2–3 parts |
| Foam Density | 60–70 lb./cu. ft. |
| Durometer Shore 00 | 70–80 |
| Channel void per square foot | 1–2 cu. in. |
| Open cell voids per square foot | 1–2 cu. in. |
| Coating weight | 25–30 oz./sq. yd. |

Without being limited to theory, it is believed that when a projectile in the form of a tennis ball strikes the court surface, commonly at a velocity between about 60 to 100 miles per hour and at an angle of incidence between about 10 to 30 degrees, the downward force of the ball on the surface is in the range of about 40 to 70 pounds for a time period of a few milliseconds. This force releases the air available under the area of contact such that this instant release lifts the surface in front of the line of travel of the ball to a more or less degree depending upon the modulus of elasticity of the total surface, the coefficient of friction between the surface and the base, the coefficient of friction between the ball and the surface and the free air contained in the open cells of the foam and the channels in the foam layer. The surface moves in a similar manner as a player's foot comes in contact with the surface.

It is known that the impact of an object is proportional to the mass, velocity and sine of the angle of incidence and inversely proportional to the time of contact. Accordingly, a change in the time of contact of the ball or the foot will cause a change in the amount of energy absorbed by the court surface. In the case of a tennis ball striking a surface, an increase in time of contact between the ball and the surface causes an increase in the angle and a decrease in the speed coming off of the surface. Similarly, in the case of a foot contacting a surface, an increase in contact time causes a decrease in the anatomical shock to the lower limbs.

The foam backing can be made to absorb energy, with the net effect of reducing the coefficient of restitution, or to be resilient, with the net effect of increasing the coefficient of restitution. By making the foam soft, dead and thick, the court surface absorbs energy through longer contact time. This energy absorption comes at the expense of the height and speed of the reflected bounce path of the ball off of the surface. Conversely a more resilient thinner foam acts in the opposite manner.

Moreover, free air may exist under and within the court surface. By varying the extent and nature of the foam backing channel 9 and by varying the ratio of closed cells 7 to open cells 8, the invention provides the capability of creating a substantial amount of free air under any area of the surface. Ball and shoe contact releases free air in front of the ball or shoe directional travel. This eliminates any resistance to surface movement at that location due to the contact friction of the foam to the base.

The scrim 4 may be composed of any material that has a proper balance of distortion limits so that the overall construction and the components of the court surface will be protected from being stretched beyond their threshold limits. The scrim material is one that has a memory that can be reformed and organized to induce a memory factor to be released in time after installation to compensate for thermal, daily and seasonal variations. The scrim is preferably composed of polypropylene, although the use of other fibers will make a product that will cover certain areas of application. For example, nylon functions satisfactorily, except where dew point variations will expand and contract the court surface by increasing or decreasing the moisture absorbed by the fibers. Thus, nylon is acceptable for locations where moisture variations are controlled. Polyester or fiberglass will fail in use over concrete that contains residual alkalinity. Fiberglass will not stretch as well as polypropylene at the same tensile strength, nor can a memory be satisfactorily induced into this fiber. Thus, for applications where these factors are not required or are controlled, polyester or fiberglass can be used.

Preferably, the scrim is a square woven polypropylene weighing 5 oz/sq. yd., the warp fibers being 24 ends of 500 denier and the fill fibers being 11 picks of 1000 denier polypropylene. Although not required, the scrim is preferably needle punched with ½ ounce per square yard of nylon, polyester, polypropylene or like materials that are cut into short staples and carded into a non woven mat.

The fibers may be needle punched through the scrim such that they extend to form a nap on both sides of the scrim. These fibers provide texture and reinforce any face coating or back coating present in the product. This reinforcement limits the elongation of the surface face and permits greater latitude of hardness to the face while preventing it from being stretched, worn off or delaminated from the base fabric by friction and torsional action of tennis shoes.

The scrim serves as a memory oriented ingredient during manufacture of the product. During application of coats or layers where high temperatures and infrared heating may be employed, the base fabric is maintained in a forced stretched condition on tenter frame pins to carry the product through the manufacturing process. Nonetheless, the base fabric is subject to shrinking as a result of the high temperatures.

Preferably, during manufacture of the court surface, the scrim is stretched to achieve a shrinkage memory of about 0.3%. This memory remains in the product as long as the material is confined in a rolled condition. About 0.2% to 0.4% is the amount of shrinkage that is preferred in the court surface after installation to absorb the thermal expansion possible through anticipated 50 degree Centigrade temperature differentials that the surface may experience.

Polypropylene fibers start to shrink at about 140° C. and melt at about 160° C. The court surface formulations of the invention develop suitable properties in terms of elongation tensile and hardness at these temperatures. By closely controlling this temperature, the combination of components such as the face coat, the scrim, the back coat and the foam, form a unique composite that will tighten up and free itself of any built in wrinkles at installation, and will develop the right amount of tension to resist puckering with temperature rises after rain showers and on hot sunny days.

The face coat 3 comprises a thermoplastic material formulation which provides a textured wear layer that enhances the longevity of the surface under intensive play, protects the fabric reinforcing scrim from ultraviolet degradation, and forms a platform spanning the various foam structures used. Preferably, the formulation comprises a plasticized polyvinyl chloride, but it may contain other polymers such as neoprene, nitrile rubber, or polyurethane. The face coat formulation generally contains about 50 to 100 parts of a dispersion grade copolymer, such as a copolymer of 4-5% acetate and polyvinyl chloride, Oxidental 6338, and about 0 to 50 parts of a suspension grade resin, such as Oxidental 521. The face coat formulation may also contain: about 0 to 100 parts of a filler, such as calcium carbonate, Georgia Marble #10 whiting; about 50 to 80 parts of a plasticizer, such as dioctyl phthalate; about 0 to 5 parts of a viscosity depressant, such as lecithin; about 0 to 4 parts of a pigment such as a phthalo green, a phthalo blue, carbon black, titanium dioxide, chrome yellow or any other pigment suitable for indoor/outdoor use common to the trade; about 0 to 2 parts of a stabilizer and long term outdoor degradation inhibitor, such as calcium zinc, Vanderbilt PLX 896; 0 to 10 parts of calcium oxide for light stability and 0 to 10 parts zinc oxide for long term stabilization of the thermoplastic materials; and about 1 to 2 parts of a flattening agent and soiling inhibitor, such as zinc stearate.

The face coat is applied to the heavier napped side of the base fabric at amounts between about 30 to 35 ounces per square yard. In accordance with the invention, the formulation of the face coat may be adjusted to obtain a predetermined coefficient of friction between the surface and the tennis ball and a predetermined resistance to abrasion, such as that which will provide at least five years of heavy duty play before surface renewal becomes necessary.

Preferably, the abrasion resistance of the face coat, as measured with a Taber Abraser instrument, using H10 wheels with 1000 gram load on each wheel, should be in the order of 30,000 cycles before wearing down to the scrim.

The following is an example of a face coat formulation used in accordance with the invention, given in parts.

| Copolymer (4–5% Acetate) PVC dispersion grade | 50 |
|---|---|
| Copolymer suspension grade resin | 50 |
| Low oil absorption calcium carbonate | 50 |
| Plasticizer Dioctyl phthalate | 55 |
| Viscosity depressant Lecithin | 3 |
| Zinc Oxide | 10 |
| Calcium oxide | 5 |
| Calcium zinc stabilizer | 2 |
| Zinc stearate | 2 |
| Heat and light resistant pigments | 1–2 |

In manufacturing the court surface, the face coat is applied to the surface of the scrim. To produce a textured surface, the face coat is fused into a hardened mass by application of infra red heat or forced air heat in an oven. To produce a non-textured surface, the face coat may be fused by pressing against a heated roll. In some cases where it may be desirable to overcoat the product for cosmetic reasons, a non-textured surface is preferred.

A back coat 5 may optionally be added for outdoor applications or to produce a higher bouncing court. The back coat enhances the firmness of the court in the area above the foam backing 6. The back coat is also made from a thermoplastic formulation, containing materials such as polyvinyl chloride, and is generally applied to the bottom side of the scrim 4 in amounts of about 30–50 ounces per square yard. In manufacturing, the back coat is applied as a wet plastisol to a scrim surface containing protruding fibers and the resulting surface would normally be textured as obtained for the face coat 3. If desired, the textured surface may be made smooth, for example by fusion, for cosmetic reasons. In one embodiment, the applied wet plastisol back coat formulation may be fused to a resilient layer by wrapping it around a heated drum under sufficient tension to press and flatten surface protrusions.

The back coat may contain the components already described for the face coat in the amounts described. The function of the back coat is to provide additional platforming for the foam, additional resistance to horizontal deformation of the surface under stress, and an improved surface for ease of application of the foam. Accordingly, certain economies such as the use of higher levels of inexpensive fillers are contemplated. A preferable formulation for a back coat, given in parts, is as follows.

| Copolymer PVC dispersion grade resin | 60 |
|---|---|
| Copolymer PVC suspension grade resin | 40 |
| Low oil absorption calcium carbonate | 200 |
| Viscosity depressant Lecithin | 5 |
| Plasticizer Dioctyl phthalate | 100 |
| Carbon black pigment | 0.2 |

The top coat 1 may be used to protect the court surface from exposure to ultra violet energy, to modify the coefficient of friction of the court surface, and to cover seams produced by any lower surfaces.

The top coat comprises one or more thermosetting resins that are specific for surfaces with vinyl-containing underlayers. The resins should be resistant to the absorption of plasticizers such as those of the phthalate variety, including those commonly used in plasticized polyvinyl chloride technology. The thermosetting resins should also have a tensile strength exceeding about 4000 pounds per square inch with a minimum elongation at break of 200%. For outdoor court surfaces, the top coat should also possess good ultra violet resistance.

Preferred top coat formulations include between about 15 to 40% dry basis of an aliphatic urethane, either water based or solvent extended, such as ICI 357, R960, 962, 966 and WITCO W212, 260, 272. In addition to the urethane component, the top coat formulation may contain: about 15 to 40 parts filler, such as calcium carbonate, silica, 200 mesh; about 15 to 40 parts of 60 to 90 mesh sand particles; about 0 to 5 parts coloring agents; about 0 to 5 parts of a cellulosic or polyacrylate viscosity control agent, such as methocel ethyl cellulose, carboxy methyl cellulose, alcogum AN10, Acrysol GS; about 0.2 to 0.5 parts of an amine cross linking agent such as Aziridine; and sufficient water to adjust the viscosity of the formulation to enhance application of the top coat.

For example, a preferable top coat formulation, given in parts, is as follows.

| ICI Aliphatic water based urethane R-960 | 15 (dry) |
|---|---|
| Filler calcium carbonate or silica | 15 |
| 60–90 mesh sand | 15 |
| color | 3 |
| ethyl cellulose | 0.5 |
| Aziridine cross linker | 0.5 |
| Water to proper squeegee viscosity | 50 |

It has been found that most acrylic concrete or asphalt paints will form a satisfactory coating by replacing the acrylic latex with the water based catalyzed urethane emulsion. In the art, a number of formulations have developed that are used to paint over concrete and asphalt slabs that normally contain a portion of sand. Most of these are based on acrylic lattices from various sources. None of these as such will function long term over a vinyl substrate. In most cases, the acrylic can be replaced in such formulations with the urethane components of this invention with improved performance.

The top coat may be applied by conventional squeegee techniques on the court site, or it may be applied at the factory during manufacturing. The top coat may also be applied by other common techniques, such as spraying, brushing and roller coating.

A barrier coat 2 may optionally be used to reduce or prevent the migration of undesirable and incompatible ingredients into the top coats that are used for outdoor or indoor applications, and to increase the adhesion of top coats to the face coat. The barrier coat comprises a film of suitable urethane polymer or epoxy coating transition layer. Single component moisture cured high solids urethanes as well as two component aromatic or aliphatic urethane commercial adhesives with a minimum elongation at break of 200% are preferred. Such compounds include Synthetic Surfaces 30 series, Ciba Araldite 6010, Epirez 510 and 5522, Epon 1001.

The film is applied to the face coat at a rate of not less than 2 to 3 ounces per square yard. Preferably, the barrier coat is applied with a lambs wool roller, however, other methods such as airless spray guns and squeegee techniques may be employed. As with the top coat, the barrier coat may be applied on site or at the factory.

While the barrier coat is optional, it is preferably used when a color coat does not contain a urethane polymer.

All or a portion of the court surface may be manufactured either on or off site. For example, when seams are not a problem, any number or all of the components may be applied at the factory. The thickness of the court surface of the invention may be any acceptable dimension. Preferably, the thickness ranges from about 125 to 250 mills (0.125 to 0.250 inches).

The court surface of the invention will resist weather extremes for a satisfactory duration of time, and will not crack or delaminate. The surface may be installed as a new surface or over existing court surfaces. When installed over existing surfaces, the court surface of the invention will bridge cracks and surface imperfections without influencing the performance of the ball. Also, the court surface is not affected by small changes to the subsurface, because the court surface is not adhered to the main playing area when installed.

It is well known that cracks that have formed in asphalt and concrete slabs will keep coming back no matter what methods are used to fill and repair such cracks. The invention allows this to occur and the platform effect of the court surface will bridge these crack renewals with no negative effect to appearance or play.

An advantage of the invention is that a tennis court surface can be made with playing characteristics that span from hard fast courts to a slow clay court. The court surface of the invention has higher energy absorption and shock absorption properties than that of the known court surfaces. The invention also provides positive footing where the energy absorption is not the result of poor footing and sliding over the surface.

Another advantage of the invention is that a transition to a new degree of firmness for movement in a new direction may be reduced or eliminated when a player's shoe is firmly planted on the court surface. The court surface is made to move horizontally by virtue of the impulse forces normal to the plain of the surface as a moving projectile in the form of a human body comes to rest as a result of positive shoe traction to the surface. The movement of the surface over the base absorbs energy from this movement and allows for opposite kinetic energy to augment a player's change in momentum in the opposite direction.

The surface may be easily installed within the boundary of an existing fence on any flat, firm new or old substrate, and can be installed without removing existing fences, or disturbing existing landscape. The surface will absorb climatic daily and seasonal thermal changes without buckling or blistering from expansion and contraction of the matrix from the coefficient of thermal expansion normal to all such materials. The surface will release any subsurface pressures that develop from any gasses formed from any source such as moisture and unexhausted low volatile hydrocarbons residual in asphaltic subsurfaces. The surface is also an effective waterproof membrane that will totally seal roof tops and parking decks while converting these areas into tennis and recreation areas.

EXAMPLE 1

A court surface is made to have the coefficient of restitution behavior characteristics of a grass court and the biomechanical kindness of a clay court. The court is prepared by starting with a scrim constructed of polypropylene fabric of 11 1000 denier picks and 24 500 denier ends. A polyvinyl face coating having a durometer of 80 (shore A) is applied to the top of the scrim and a top coat containing an aliphatic resilient urethane mixed with 30% to 50% sand is applied to the face coat. A foam backing containing 50% open cells, and having a 25 pound per cubic foot density and a durometer of 60 to 70 (shore 00) is applied below the scrim. The foam backing has sufficient open channels at the bottom to provide 10 cubic inches per square foot of free air under the foam surface.

EXAMPLE 2

FIG. 3 provides a graphical representation of the path of a tennis ball as it leaves the surface of grass, clay hard court surfaces and various court surfaces of the invention. The paths are shown for a ball contact at an angle of incidence of 25 degrees and a speed of 70 miles per hour. This angle and speed approximates an average hard hit serve and ground stroke after the effects of wind resistance, gravity and spin.

The court surface of FIG. 4 defined as "CLAY TYPE" is a court made according to the foam formulation parameters described earlier for a CLAY TYPE surface, with 5 ozs./sq. yd. of a urethane color coat formulated with 90 mesh sand, 30 ozs./sq. yd. of a face coat of vinyl formulated with 80 parts of OXY 6338 and 20 of OXY 521, 25 parts of calcium carbonate, and 80 to 90 parts of dioctylphthalate. The court also contains the preferred polypropylene scrim and does not contain a back coat.

The "MEDIUM BOUNCE" court surface is a court made according to the foam formulation parameters described earlier for a MEDIUM TYPE court, with 10 ozs./sq. yd. of a urethane color coat formulated with a 50/50 blend of 60 and 90 mesh sand, 35 ozs./sq. yd. of a face coat of vinyl formulated with 60 parts of OXY 6338 and 40 parts of OXY 521, 100 parts of calcium carbonate and 70 parts of dioctylphthalate. The court also contains the preferred polypropylene scrim and 30 ozs./sq. yd. of a back coat, formulated with 60 parts of OXY 6338, 40 parts of OXY 521, 200 parts of calcium carbonate and 80 parts of dioctylphthalate with 5 parts of lecithin.

The "HARD TYPE" court is made according to the foam formulation parameters described earlier for a HARD COURT TYPE, with 10 ozs./sq. yd. of a urethane color coat formulated with 60 mesh sand, 35 ozs./sq. yd. of a face coat of vinyl formulated with 80 parts of OXY 6338, 20 parts of OXY 521, no filler and 55 parts of dioctylphthalate. The court contains the preferred polypropylene scrim and 30 ozs./sq. yd. of a back coat containing 100 parts of calcium carbonate filler.

While the foregoing examples describe several embodiments of the invention, it is to be understood that the invention is a combination of components that yields a flexible and versatile court surface. Accordingly, predetermined court surface characteristics can be produced from a plurality of combinations of the components described or their equivalents.

I claim:

1. A court surface comprising:
   a base comprising a plasticized foam thermoplastic material;
   a scrim located above the base to provide dimensional stability, said scrim comprising a plasticized thermoplastic material; and
   a top coat located above the scrim, said top coat comprising a thermosetting resin that is resistant to absorption of plasticizers.

2. The court surface of claim 1 wherein the foam material comprises polyvinyl chloride, said foam material having a density between about 20 to 70 pounds per cubic foot, between about 0 to 10 cubic inches of channel voids per square foot, and between about 0 to 10 cubic inches of open cell voids per square foot.

3. The court surface of claim 1 wherein the scrim comprises polypropylene.

4. The court surface of claim 1 wherein the top coat comprises an aliphatic urethane.

5. The court surface of claim 1 further comprising sand particles.

6. A court surface comprising:
a plasticized foam thermoplastic material comprising polyvinyl chloride;
a scrim located above the foam material, said scrim comprising a woven polypropylene;
a plasticized thermoplastic material comprising polyvinyl chloride applied to the top of the scrim; and
a thermosetting resin that is resistant to absorption of plasticizers, said resin applied above the scrim.

7. The court surface of claim 6 wherein the foam material has a density between about 20 to 50 pounds per cubic foot, between about 8 to 10 cubic inches of channel voids per square foot, and between about 8 to 10 cubic inches of open cell voids per square foot.

8. The court surface of claim 6 wherein the thermosetting resin comprises an aliphatic urethane.

9. The court surface of claim 6 wherein the thermosetting resin is mixed with sand particles.

10. A court surface comprising:
a plasticized foam thermoplastic material comprising polyvinyl chloride;
a scrim located above the foam material, said scrim comprising a woven polypropylene;
a first plasticized thermoplastic material comprising polyvinyl chloride applied to the bottom of the scrim;
a second plasticized thermoplastic material comprising polyvinyl chloride applied to the top of the scrim; and
a thermosetting resin that is resistant to absorption of plasticizers, said resin applied above the second thermoplastic material.

11. The court surface of claim 10 wherein the foam material has a density between about 40 to 70 pounds per cubic foot, between about 0 to 3 cubic inches of channel voids per square foot, and between about 0 to 7 cubic inches of open cell voids per square foot.

12. The court surface of claim 10 wherein the thermosetting resin comprises an aliphatic urethane.

13. The court surface of claim 10 wherein the thermosetting resin is mixed with sand particles.

14. A court surface comprising:
a base comprising a foam thermoplastic material;
a scrim located above the base to provide dimensional stability, said scrim comprising a thermoplastic material;
a thermosetting material selected from urethane or epoxy applied above the scrim; and
a thermoplastic material applied above the thermosetting material.

15. The court surface of claim 14 wherein the foam material comprises polyvinyl chloride, said foam material having a density between about 20 to 70 pounds per cubic foot, between about 0 to 10 cubic inches of channel voids per square foot, and between about 0 to 10 cubic inches of open cell voids per square foot.

16. The court surface of claim 14 wherein the scrim comprises polypropylene.

17. The court surface of claim 14 wherein the thermoplastic material comprises an acrylic latex.

* * * * *

UNITED STATES PATENT AND TRADEMARK OFFICE
CERTIFICATE OF CORRECTION

PATENT NO. : 5,352,158
DATED : October 4, 1994
INVENTOR(S) : Edouard A. Brodeur, Jr.

It is certified that error appears in the above-indentified patent and that said Letters Patent is hereby corrected as shown below:

On the title page, item [56], under "References Cited U.S. PATENT DOCUMENTS" please add the following:

| | | | |
|---|---|---|---|
| 3,695,987 | 10/1972 | Wisotzky et al. | 161/67 |
| 3,728,182 | 04/1973 | Wisotzky et al. | 156/72 |
| 3,771,787 | 11/1973 | Wood, Jr. | 273/29 R |
| 3,902,452 | 09/1975 | Queen et al. | 118/66 |
| 3,953,269 | 04/1976 | Queen et al. | 156/79 |
| 3,974,312 | 08/1976 | Stevens et al. | 428/91 |
| 4,010,301 | 03/1977 | Anderson et al. | 428/95 |

UNITED STATES PATENT AND TRADEMARK OFFICE
CERTIFICATE OF CORRECTION

PATENT NO. : 5,352,158
DATED : October 4, 1994
INVENTOR(S) : Edouard A. Brodeur, Jr.

It is certified that error appears in the above-indentified patent and that said Letters Patent is hereby corrected as shown below:

| | | | |
|---|---|---|---|
| 4,010,302 | 03/1977 | Anderson et al. | 428/95 |
| 4,081,579 | 03/1978 | Queen et al. | 428/95 |
| 4,582,554 | 04/1986 | Bell et al. | 156/247 |

Signed and Sealed this

Thirty-first Day of October 1995

Attest:

BRUCE LEHMAN

*Attesting Officer*     *Commissioner of Patents and Trademarks*